(12) United States Patent
Kajihara et al.

(10) Patent No.: US 10,584,981 B2
(45) Date of Patent: Mar. 10, 2020

(54) SURFACE TEXTURE MEASURING APPARATUS

(71) Applicant: Mitutoyo Corporation, Kawasaki, Kanagawa (JP)

(72) Inventors: Toshihiko Kajihara, Kure (JP); Nobuyuki Hama, Higashihiroshima (JP); Tatsuki Nakayama, Kure (JP); Toshihiro Kanematsu, Miyazaki (JP); Hiroomi Honda, Miyazaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 120 days.

(21) Appl. No.: 15/981,395

(22) Filed: May 16, 2018

(65) Prior Publication Data
US 2018/0340798 A1 Nov. 29, 2018

(30) Foreign Application Priority Data

May 24, 2017 (JP) ................................. 2017-102609

(51) Int. Cl.
*G01D 5/34* (2006.01)
*G01B 5/28* (2006.01)

(52) U.S. Cl.
CPC .............. *G01D 5/342* (2013.01); *G01B 5/28* (2013.01)

(58) Field of Classification Search
CPC ........ G01B 5/28; G01B 5/201; G01B 21/047; G01B 3/008; G01B 5/20; G01B 21/30; G01B 5/0004; G01B 5/012; G01B 5/016
USPC ..................................................... 33/501.03
See application file for complete search history.

(56) References Cited

U.S. PATENT DOCUMENTS

| 7,715,999 B2* | 5/2010 | Kiyotani | G01B 5/28 33/503 |
| 8,915,124 B2* | 12/2014 | Nakayama | G01B 5/016 33/554 |
| 2002/0170196 A1* | 11/2002 | Takemura | G01B 7/28 33/551 |

(Continued)

FOREIGN PATENT DOCUMENTS

| JP | 5735337 | 6/2015 |
| JP | 2017-003559 | 1/2017 |

*Primary Examiner* — Yaritza Guadalupe-McCall
(74) *Attorney, Agent, or Firm* — Rankin, Hill & Clark LLP

(57) ABSTRACT

There is provided a surface texture measuring apparatus in which a measurement device is replaced easily and safely. A measurement device is replaceable by attaching and detaching the measurement device to and from a drive mechanism part. The measurement device includes a bracket, and the bracket includes a first connector for transmitting and receiving a signal to and from the measurement device and feeding to the measurement device. The drive mechanism part includes a support frame to which the bracket is detachably attached, and the support frame includes a second connector electrically connected to the first connector. The signal is transmitted and received between the first connector and the second connector, and the first connector is fed from the second connector while the first connector and the second connector are connected. Insertion and removal between the first connector and the second connector to attach and detach the measurement device to and from the drive mechanism part is hot swappable.

6 Claims, 14 Drawing Sheets

(56) References Cited

U.S. PATENT DOCUMENTS

| | | | | |
|---|---|---|---|---|
| 2005/0132591 A1* | 6/2005 | Kojima | .................... | G01B 5/08 |
| | | | | 33/503 |
| 2005/0223579 A1* | 10/2005 | Otsubo | ................ | G01B 21/047 |
| | | | | 33/502 |
| 2007/0056176 A1* | 3/2007 | Matsumiya | ............ | G01B 7/008 |
| | | | | 33/551 |
| 2007/0271803 A1* | 11/2007 | Ishikawa | ................ | G01B 5/008 |
| | | | | 33/503 |
| 2009/0300929 A1* | 12/2009 | McDonnell | ............ | G01B 5/201 |
| | | | | 33/559 |
| 2010/0018298 A1* | 1/2010 | Kanematsu | .......... | G01B 5/0004 |
| | | | | 73/104 |
| 2011/0005095 A1* | 1/2011 | Nakayama | ............ | G01B 3/008 |
| | | | | 33/556 |
| 2012/0266475 A1* | 10/2012 | Nakayama | ............ | G01B 3/008 |
| | | | | 33/558 |
| 2014/0331511 A1* | 11/2014 | Yamauchi | ................ | G01B 5/20 |
| | | | | 33/558 |
| 2016/0131470 A1* | 5/2016 | Ishikawa | .............. | G01B 21/045 |
| | | | | 33/503 |
| 2017/0227346 A1 | 8/2017 | Yamauchi | | |
| 2018/0340798 A1* | 11/2018 | Kajihara | ................ | G01D 5/342 |

* cited by examiner

SURFACE TEXTURE MEASURING APPARATUS

INCORPORATION BY REFERENCE

This application is based upon and claims the benefit of priority from Japanese patent application No. 2017-102609, filed on May 24, 2017, the disclosure of which are incorporated herein in its entirety by reference.

BACKGROUND OF THE INVENTION

1. Field of the Invention

The present invention relates to a surface texture measuring apparatus.

2. Description of Related Art

There is a surface texture measuring apparatus that moves a stylus while bringing the stylus into contact with the surface of an object to be measured to obtain the shape data of the object to be measured from the displacement of the stylus at that time (JP 5735337 B and JP 2017-3559 A).

FIG. 1 is a perspective view of an appearance of a surface texture measuring apparatus 10.

The surface texture measuring apparatus 10 includes a measurement machine main part 20 and a measurement device 70 that is replaceable so as to be attached to and detached from the measurement machine main part 20.

The measurement machine main part 20 includes a base 30 and a drive mechanism part 40.

The drive mechanism part 40 is provided so as to stand on the base 30.

The drive mechanism part 40 includes a Z column 41, a Z slider 42, a Z drive mechanism 43, and an X drive mechanism 50.

The Z column 41 is provided so as to stand on the upper surface of the base 30.

The Z slider 42 is provided so as to be movable in the vertical direction (Z axis direction) along the Z column 41.

The Z drive mechanism 43 is provided inside the Z column 41 and moves the Z slider 42 in the vertical direction. As an example of the Z drive mechanism 43, a feed screw mechanism can be used. For example, a ball screw shaft is provided in parallel to the Z column 41, and a detent nut member is screwed with the ball screw shaft. Then, the nut member is coupled to the Z slider 42.

FIG. 2 shows internal mechanisms of the Z slider 42 and the measurement device 70.

The X drive mechanism 50 is provided inside the Z slider 42 and moves the measurement device 70, which is suspended and supported under of the Z slider 42, in the X axis direction.

The X drive mechanism 50 includes, inside the casing of the Z slider 42, a guide rail 51, an X slider 52, and a feeding mechanism 53 as shown in FIG. 2. The guide rail 51 is provided in parallel to the X axis direction. The X slider 52 is provided so as to be movable in the X axis direction along the guide rail 51. The feeding mechanism 53 moves the X slider 52 along the guide rail 51.

The feeding mechanism 53 includes a feed screw shaft 54, a motor 55, and a transmitting mechanism 56, and rotates the feed screw shaft 54 by the power of the motor 55. A detent nut member (not shown) is screwed with the feed screw shaft 54, and the nut member is coupled to the X slider 52.

Although not shown, a moving stage may be arranged on the base.

The measurement device 70 includes a casing 71, a bracket 72, a measurement arm 75, a stylus 77, and a displacement detector 78 as shown in FIG. 2.

The bracket 72 is suspended and supported by the X slider 52.

The bracket 72 is attachable to and detachable from the X slider 52 by a bolt 73. The bracket 72 supports the measurement arm 75 so that the measurement arm 75 can swing in the vertical direction (move arcuately) using a rotation shaft 76 as a fulcrum.

The stylus 77 is provided at the tip of the measurement arm 75. The displacement detector 78 detects the amount of the arcuate movement of the measurement arm 75 (the amount of displacement in the Z axis direction).

With the above configuration, the measurement device 70 can be moved relatively to an object to be measured by the drive mechanism part 40.

The measurement device 70 is moved along a surface to be measured while the stylus 77 of the measurement device 70 is being brought into contact with the surface to be measured. The displacement detector 78 detects the minute vertical motion of the stylus 77 at this time as the amount of swinging of the measurement arm 75. The shape data of the object to be measured is thereby obtained.

In FIGS. 1 and 2, an example of the measurement device 70 is shown, but the measurement device 70 is available in a variety of types used for various purposes. Such various measurement devices 70 having different measurement sensitivities (magnifications), measurement strokes, measurement force, or the like are prepared, and a user performs measurement by replacing the measurement device 70 depending on the purpose.

For example, in FIG. 3, a measurement device (contour measurement device) 70A is attached to the measurement machine main part 20, and a measurement device (roughness measurement device) 70B is supported by a stand 90.

FIG. 4 is a perspective view of the measurement device 70.

In FIG. 4, the bracket 72 is fixed to a hanging frame 60 of the X slider 52 by the bolt 73.

The hanging frame 60 is fixed to the X slider 52 by screws 61.

FIG. 4 shows that the hanging frame 60 is detached from the X slider 52 for the sake of convenience. However, a user does not normally detach the hanging frame 60 from the X slider 52, and the hanging frame 60 may be considered as a part of the X slider 52.

On both sides of the bracket 72, lock/unlock auxiliary levers 74 are provided. When the lock/unlock auxiliary levers 74 are opened as shown in FIG. 4, one ends (not shown) of the lock/unlock auxiliary levers 74 are engaged with the hanging frame 60, and when the lock/unlock auxiliary levers 74 are closed as shown in FIG. 5, the lock/unlock auxiliary levers 74 are released from the hanging frame 60.

A procedure for replacing the measurement device 70 is briefly described.

In order to replace the measurement device 70, first, the user turns off the power of the measurement machine main part 20. When the power of the measurement machine main part 20 is turned off, electric power supply from the measurement machine main part 20 to the measurement device 70 is stopped, and the power of the measurement device 70 is also turned off. Then, the user removes the bolt 73 with a tool (a special wrench or spanner) to release the bracket 72 from the hanging frame 60.

Next, the user supports the measurement device 70 with one hand while closing the lock/unlock auxiliary levers 74 with the other hand as shown in FIG. 5.

While releasing the bracket 72 from the hanging frame 60 by the lock/unlock auxiliary levers 74, the user slowly pulls out the measurement device 70. Accordingly, the measurement device 70 is detached from the hanging frame 60.

In order to attach the measurement device 70 to the measurement machine main part 20, while turning off the power of the measurement machine main part 20, the user attaches the measurement device 70 to the X slider 52 by engaging the bracket 72 with the hanging frame 60. Then, the user tightens the bolt 73 with a tool (a special wrench or spanner) to fasten the bracket 72 to the hanging frame 60. Lastly, the user turns on the power of the measurement machine main part 20 and restarts the software.

SUMMARY OF THE INVENTION

As described above, it has taken a lot of steps and time to replace a measurement device.

Furthermore, when replacing the measurement device, the correct order of the procedure is very important. It is because the measurement device cannot properly restart if the measurement device is replaced with powered on.

In addition, the user is required to support the measurement device with one hand while operating the lock/unlock auxiliary levers with the other hand, but the measurement device can be unstable when it is supported with only one hand.

If the user needs to frequently replace the measurement device, the measurement efficiency is significantly reduced, and the above replacing bothers the user.

The objective of the present invention is to provide a surface texture measuring apparatus in which a measurement device is replaced easily and safely.

A surface texture measuring apparatus in an exemplary embodiment of the present invention includes:

a measurement device that performs scanning measurement by contacting or without contacting a surface of an object to be measured; and a measurement machine main part including a drive mechanism part that moves the measurement device relatively to the object to be measured.

The measurement device is provided so as to be replaceable by attaching and detaching the measurement device to and from the drive mechanism part.

The measurement device includes a bracket for attaching the measurement device to the drive mechanism part.

The bracket includes a first connector for transmitting and receiving a signal to and from the measurement device and supplying electricity to the measurement device.

The drive mechanism part includes a support frame to which the bracket is detachably attached. The support frame includes a second connector electrically connected to the first connector.

The signal is transmitted and received between the first connector and the second connector, and the first connector is fed from the second connector while the first connector and the second connector are connected.

The first connector and the second connector are hot swappable. That is, when the measurement device is attached and detached to and from the drive mechanism part, they can be inserted and removed with powered on.

In an exemplary embodiment of the present invention, the bracket includes a shaft provided so as to project from an end face.

The support frame includes an attachment/detachment detecting sensor that receives the shaft and detects whether the shaft exists.

The second connector and the first connector are electrically connected when the attachment/detachment detecting sensor detects that the shaft exists.

The second connector and the first connector are electrically disconnected when the attachment/detachment detecting sensor detects that the shaft does not exit.

In an exemplary embodiment of the present invention, the bracket includes a shaft-shaped clamper provided so as to pierce the bracket.

The clamper is provided so as to be rotatable about an axis and so as not to move forward and backward with respect to the bracket in an axial direction.

The support frame includes a clamp hole for receiving the clamper.

The clamper and the clamp hole are engaged and disengaged by rotation operation of the clamper.

In an exemplary embodiment of the present invention, either one of the clamper and the clamp hole includes a spiral groove.

The other one of the clamper and the clamp hole includes a lock key to be received by the spiral groove.

In an exemplary embodiment of the present invention, the clamper has a tip having a handle as a manual operation means, and the handle is a lever type so as to be held.

In an exemplary embodiment of the present invention, a stand at which the measurement device for replacement stands by is further included, and the stand includes the support frame.

DETAILED DESCRIPTION

Figure 1:
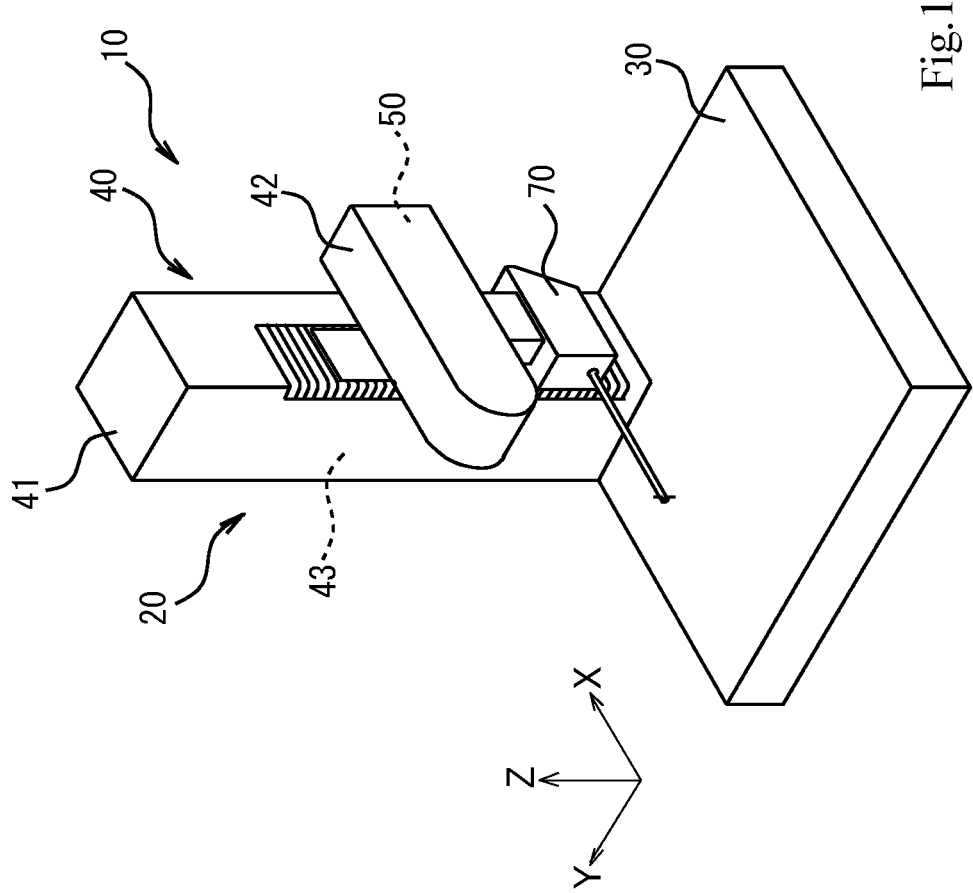
FIG. 1 is a perspective view of an appearance of a surface texture measuring apparatus.
Figure 2:
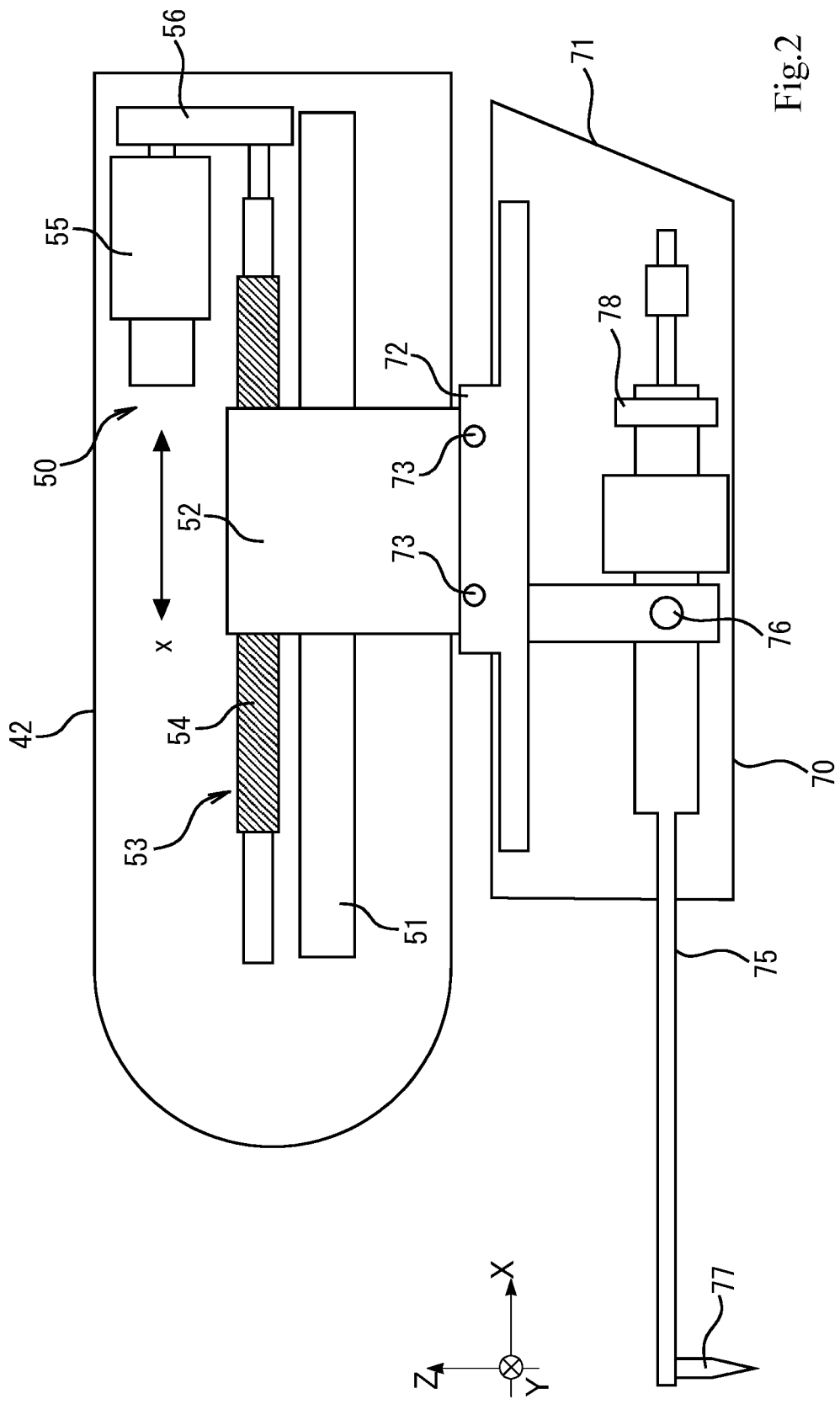
FIG. 2 is a diagram showing internal mechanisms of a Z slider and a measurement device.
Figure 3:
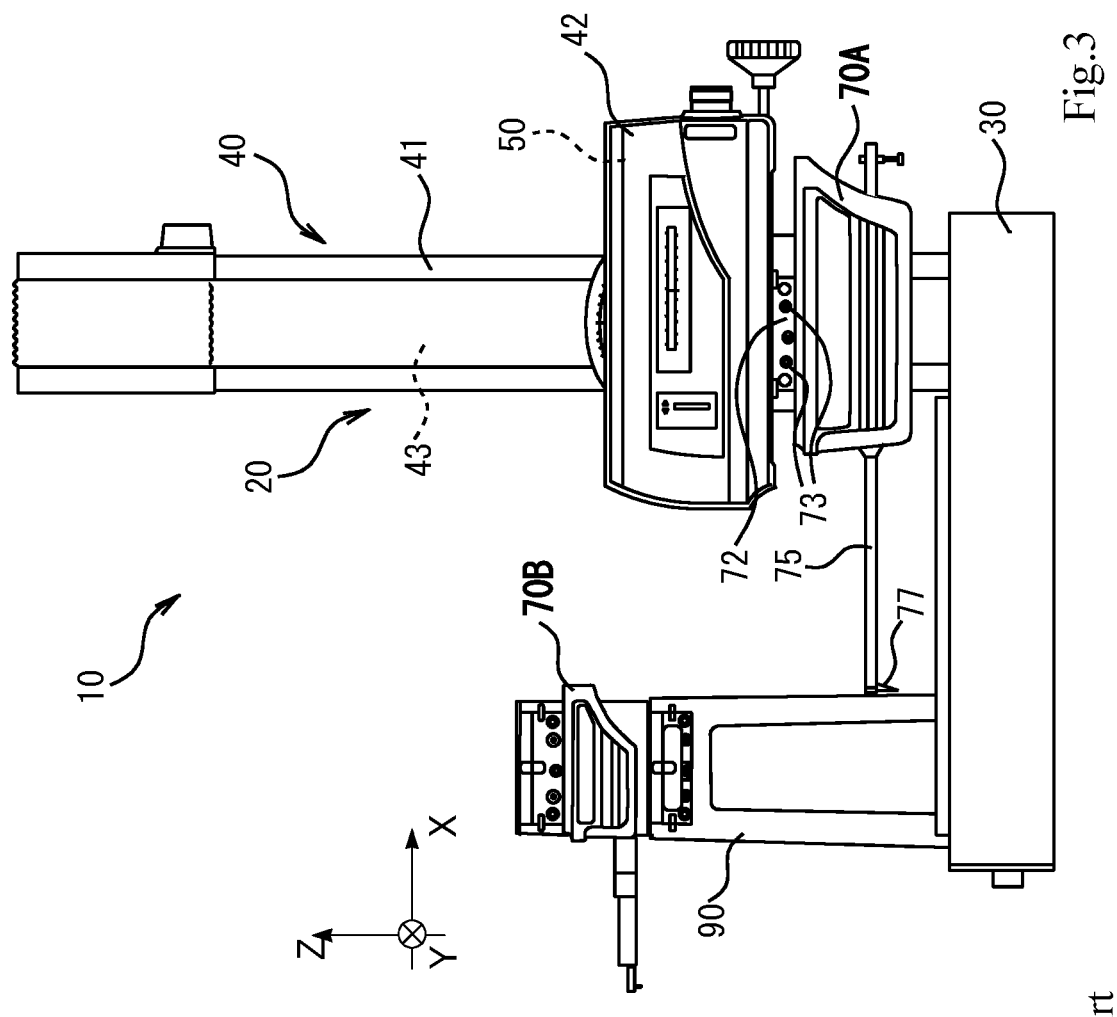
FIG. 3 is a view of a contour measurement device attached to a measurement machine main part and a roughness measurement device in a standby state on a stand.
Figure 4:
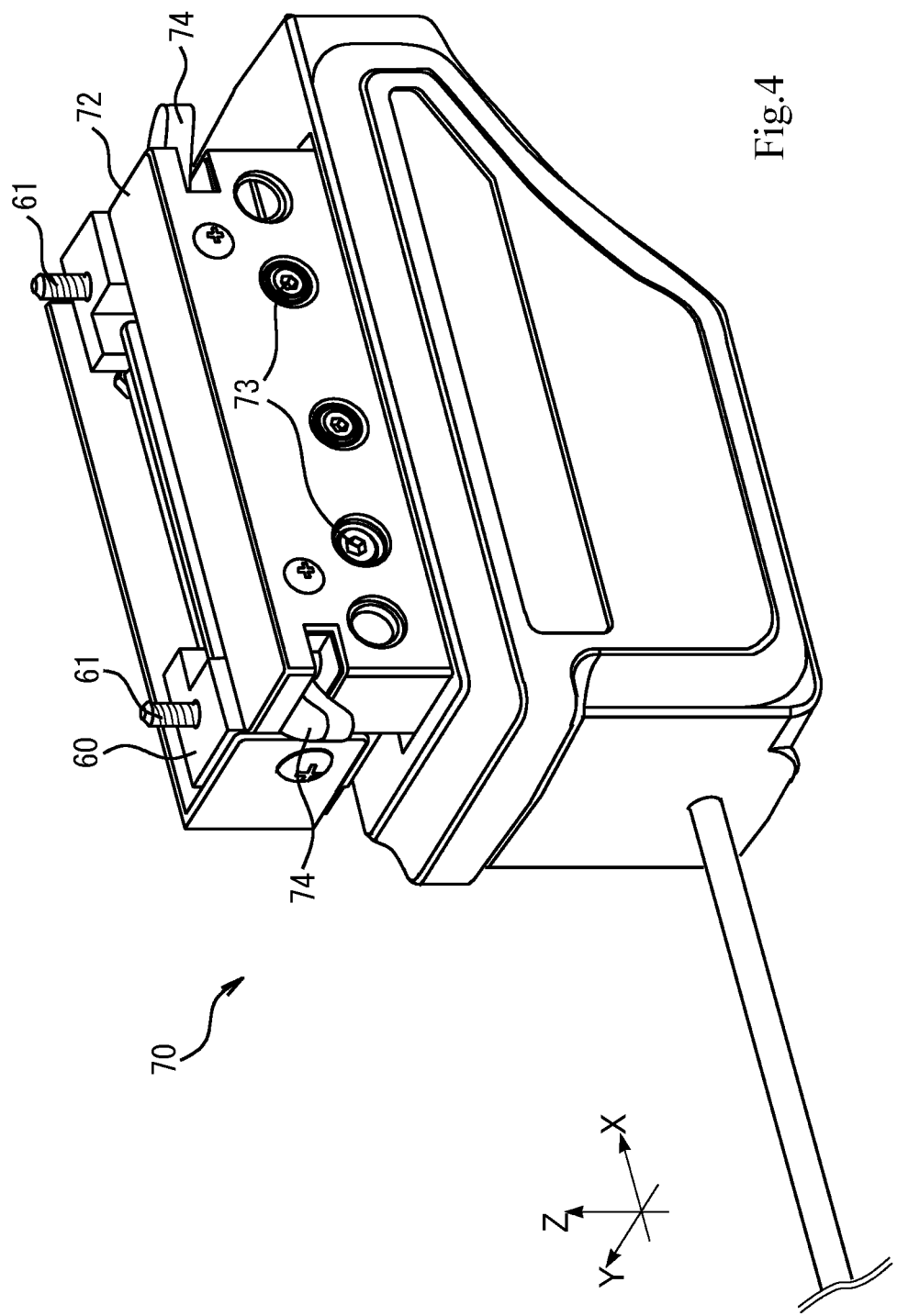
FIG. 4 is a perspective view of a measurement device.
Figure 5:
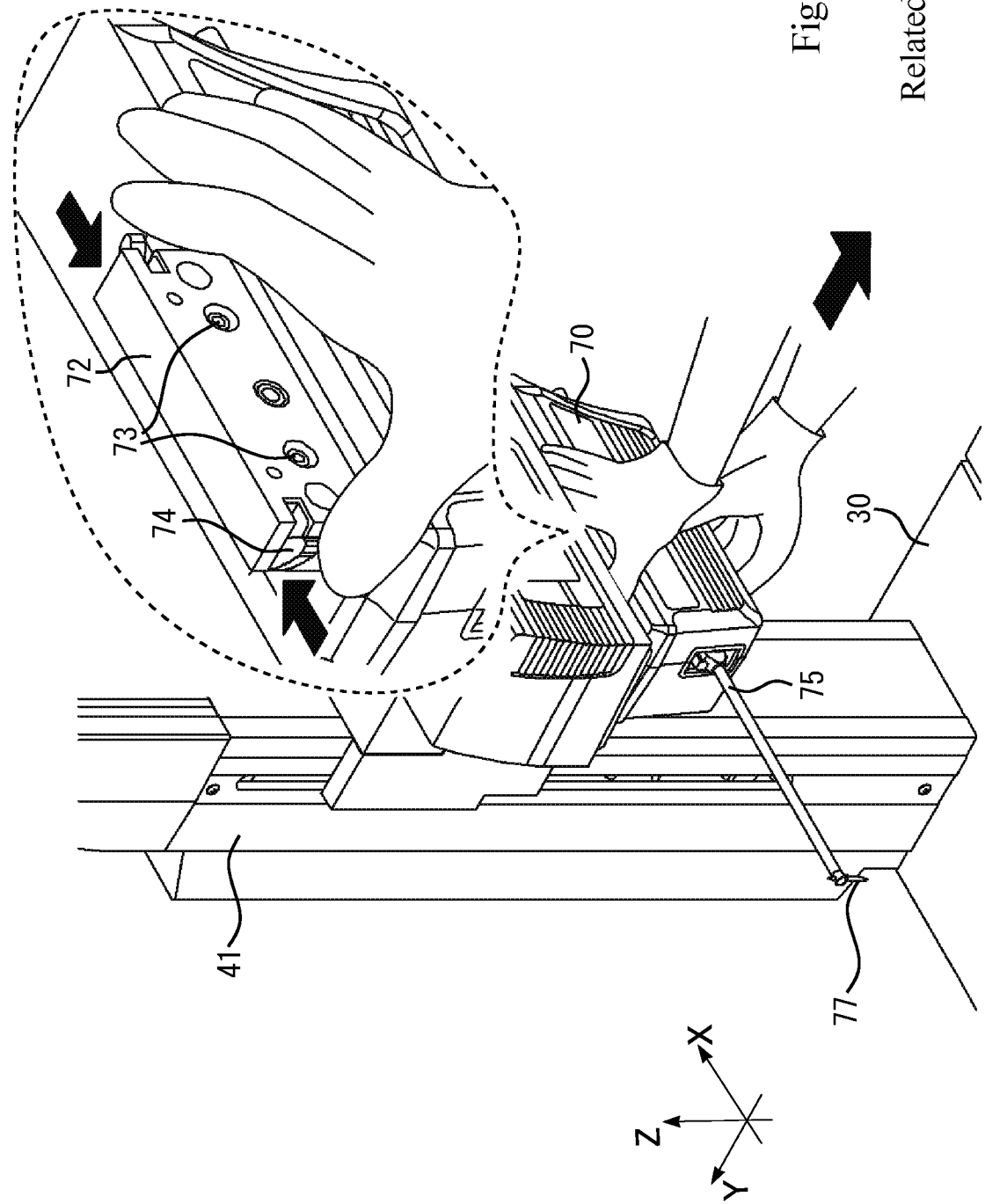
FIG. 5 is a diagram explaining that the measurement device is being attached and detached while lock/unlock auxiliary levers are closing.

An exemplary embodiment of the present invention is illustrated and described with reference to reference signs assigned to constituent elements in the drawings.

First Exemplary Embodiment

Figure 6:
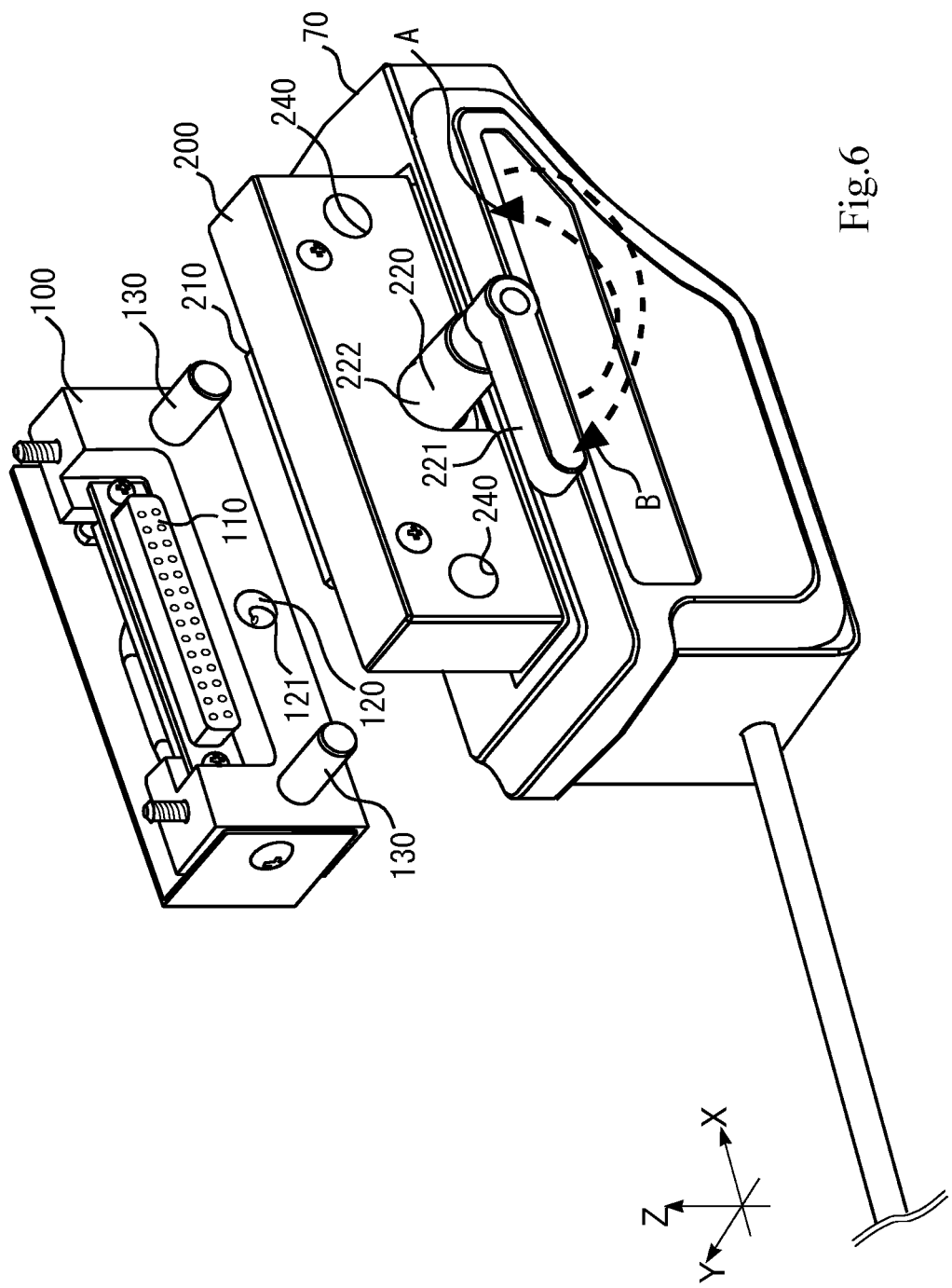
FIG. 6 is a perspective view of a first exemplary embodiment.

FIG. 6 is a perspective view showing a first exemplary embodiment.

The first feature in the first exemplary embodiment is that the measurement device can be hot-swappable.

The second feature in the first exemplary embodiment is that a measurement device 70 can be attached to and detached from a hanging frame 100 by providing a handle as a manual operation means at a tip of a clamper 220 and turning the clamper 200.

In other words, according to the first exemplary embodiment, it is possible to attach and detach the measurement device 70 to and from the hanging frame 100 only by a single operation (turning the clamper 220) without tools.

The replacement mechanism of the measurement device 70 in the present exemplary embodiment is referred to as a "one-action attachment/detachment mechanism".

Hereinafter, the one-action attachment/detachment mechanism is described.

First, a configuration of the hanging frame 100 is described.

Note that, a configuration of a measurement machine main part 20 may be the same as that in Related Art except for the hanging frame 100 which is a support frame, and the configuration of the hanging frame 100 is mainly described below.

In addition, a configuration of the measurement device 70 may be the same as that in Related Art except for a bracket 200, and the configuration of the bracket 200 is mainly described below.

In FIG. 6, a face at one side of the hanging frame 100 to which the bracket 200 is attached (−Y side) is referred to as a front face of the hanging frame 100, and a face at the other side (+Y side) is referred to as a back face.

Figure 7:
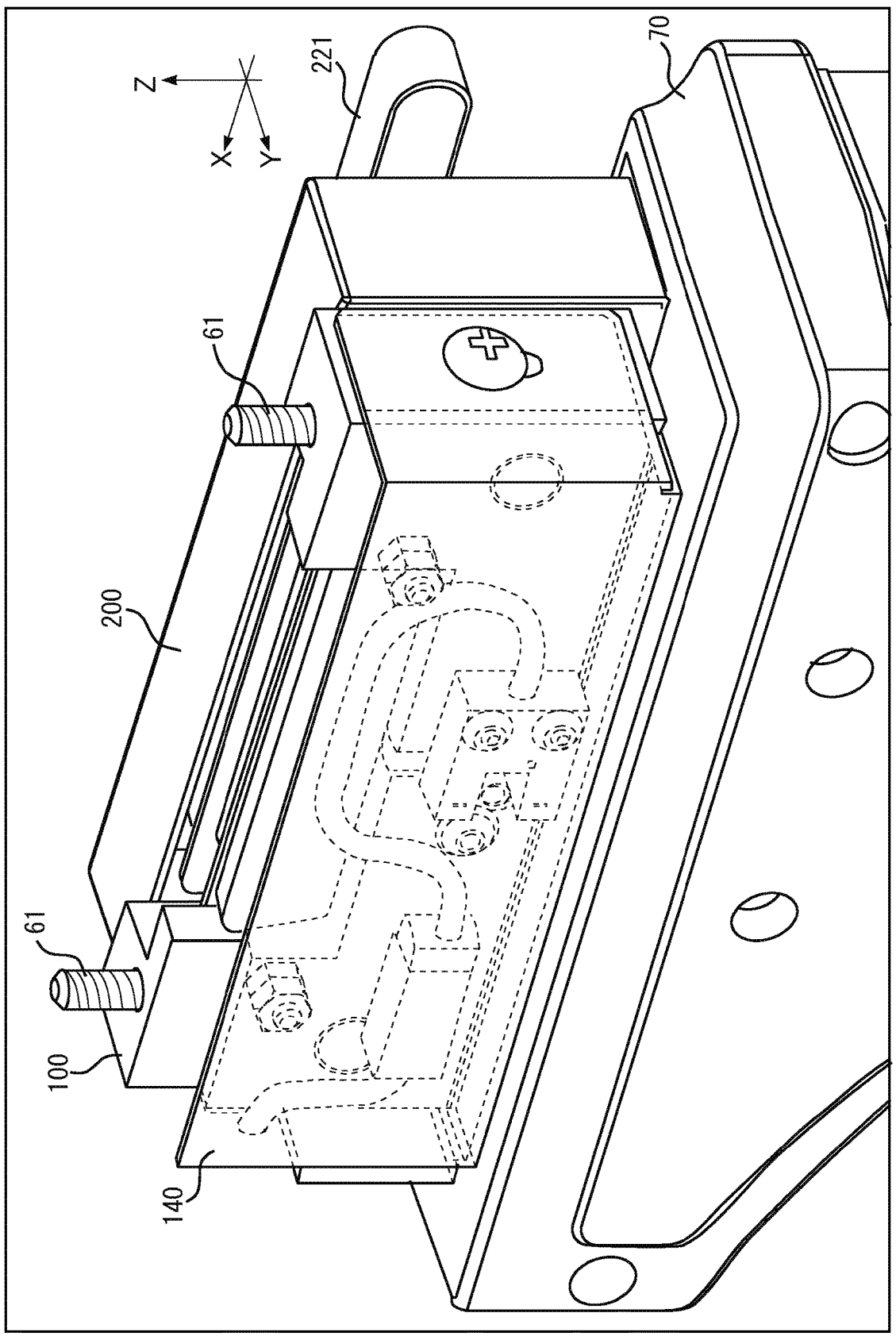
FIG. 7 is a view of a back face of a hanging frame.
Figure 8:
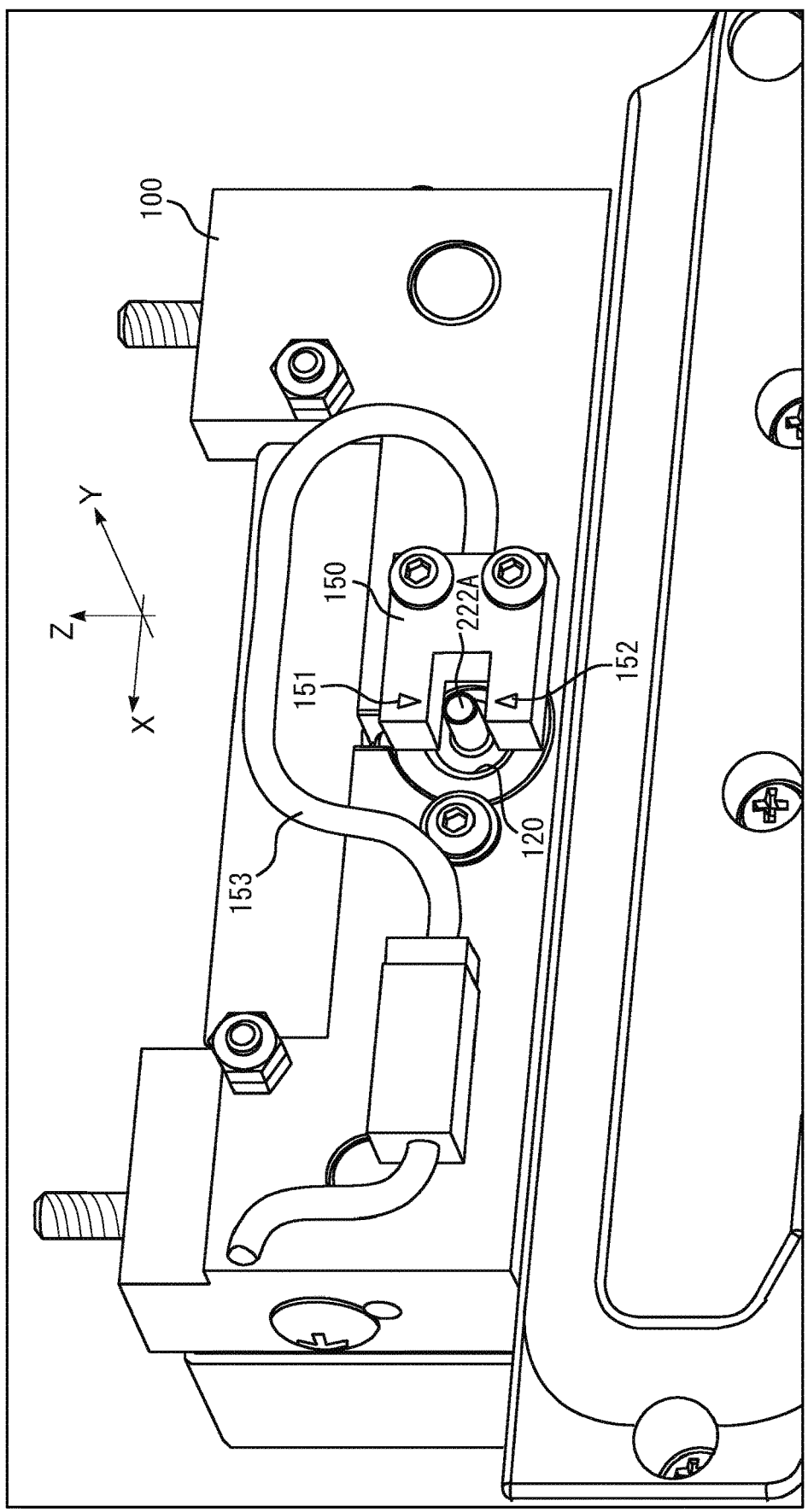
FIG. 8 is a view of the back face of the hanging frame after removing a protection cover.

Accordingly, FIGS. 7 and 8 show the back face of the hanging frame 100.

The hanging frame 100 is provided with a socket 110 of a connector as a second connector, and the socket 110 is connected to a pin connector 210 provided to the measurement device 70 as a first connector.

The hanging frame 100 is provided with a through hole piercing the front face though to the back face. The through hole serves to lock and release the clamper 220, and thus is referred to as a clamp hole 120. A lock key 121 is provided inside the clamp hole 120 so as to project.

As shown in the cross sections of FIGS. 9 to 11, and 13, the lock key 121 is a ball 121 arranged inside the clamp hole 120. Here, two balls 121 as the lock key 121 are provided so as to face each other.

In addition, two support pins 130 are provided on the front face of the hanging frame 100 so as to project.

FIG. 7 shows the back face of the hanging frame 100. FIG. 8 shows a sensor part after removing a protection cover 140 to be easily seen. As shown in FIG. 8, a U-shaped photointerrupter 150 is arranged on the back face of the hanging frame 100 so as to sandwich the opening of the clamp hole 120, and functions as an attachment/detachment detecting sensor.

The photointerrupter 150 includes a light emitting portion 151 at one end and a light receiving portion 152 at the other end, and detects whether there is an object between the light emitting portion 151 and the light receiving portion 152. A detection signal of the photointerrupter 150 is to be transmitted to an external control unit through a cable 153.

In FIG. 8, a tip 222A of the clamper 220 projects from the clamp hole 120. At this time, light from the light emitting portion 151 is blocked by the tip 222A of the clamper 220, and does not reach the light receiving portion 152.

When the light receiving portion 152 does not detect the light, the measurement device 70 is connected to the hanging frame 100. Thus, a low-level signal of the light receiving portion 152 is referred to as a connection detection signal.

Next, the bracket 200 is described.

The pin connector 210 is provided on the back face of the bracket 200. When the pin connector 210 is connected to the socket 110, the measurement machine main part 20 and the measurement device 70 are electrically connected, and power and signals can be exchanged.

The bracket 200 is provided with the clamper 220.

The clamper 220 includes a handle 221 and a clamp shaft 222.

The handle 221 is preferably a lever type for a user to stably hold it. For example, the handle 221 is preferably the one which is moved up or down by being stably held as exemplified in the present exemplary embodiment rather than the one that is turned with fingers like a thumbturn. (Needless to say, a thumbturn is not excluded.)

The clamp shaft 222 is to be inserted into the clamp hole 120 as shown in FIGS. 9 to 11, and 13.

The clamp shaft 222 is provided so as to project from the front face of the bracket 200 and pierce the back face. Inside the bracket 200, a pin 230 is provided toward the clamp shaft 222. The clamp shaft 222 is provided with a keyway 223 in the circumferential direction, and the tip of the pin 230 is fitted into the keyway 223 in order for the clamp shaft 222 not to come off from the bracket 200. That is, the clamp shaft 222 is rotatable, but does not move forward and backward with respect to the bracket 200 in the axial direction (the Y axis direction) (which means relative displacement does not occur).

A spline groove 224 (spiral groove) is provided at the tip side of the clamp shaft 222.

The spline groove 224 is provided to receive the ball 121 which is the lock key 121. By holding the handle 221 and turning the clamper 220, the engagement of the spline groove 224 and the ball 121 draws the clamper 220 in the clamp hole 120, or pushes the clamper 220 out of the clamp hole 120. Since two balls 121 are provided, two spline grooves 224 are provided accordingly.

The bracket 200 is provided with two support holes 240 that receive the two support pins 130 of the hanging frame 100.

With reference to FIGS. 9 to 12, a procedure for detaching the measurement device 70 from the hanging frame 100 by operating the handle of the clamper 220 is described.

As shown in FIGS. 6 and 7, when the lever of the handle 221 is horizontal, the bracket 200 of the measurement device 70 is attached to the hanging frame 100.

This position of the handle 221 (horizontal position) is assumed to be 0°.

When the handle 221 is turned by 180° in the counterclockwise direction and positioned oppositely (at the position of the arrow A in FIG. 6), the bracket 200 of the measurement device 70 comes off from the hanging frame 100.

This position of the handle 221 is assumed to be 180°. In order to attach and detach the measurement device 70 to and from the hanging frame 100, the user is only required to simply turn the handle 221 by 180°. By turning the handle 221, power supply to the measurement device 70 is automatically turned on or off by hot swapping. In addition, by turning the handle 221, the measurement device 70 is automatically drawn into the hanging frame 100 or pushed out of the hanging frame 100.

Figure 9:
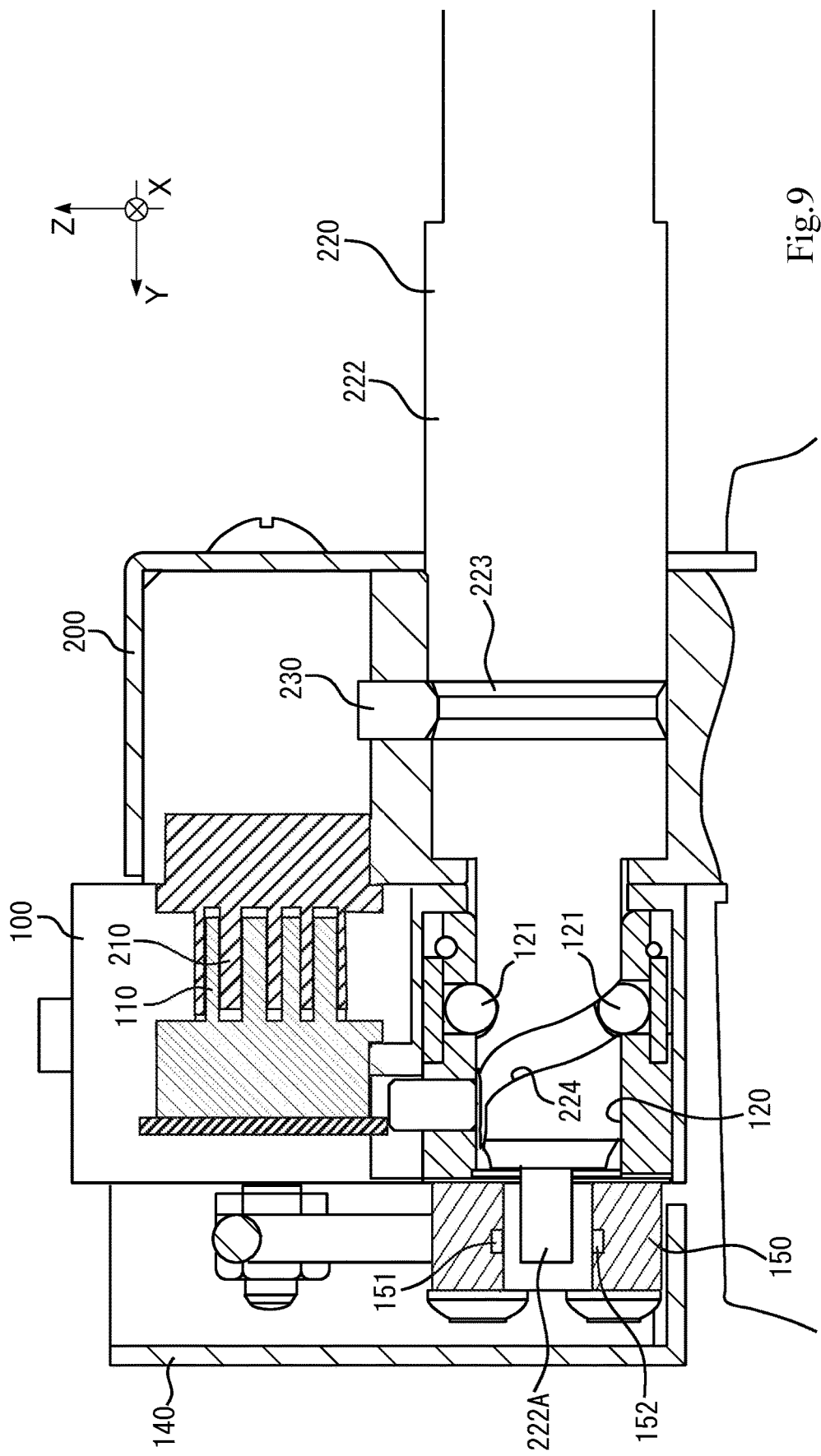
FIG. 9 is a diagram explaining a procedure for detaching a measurement device from the hanging frame by operating a handle of a clamper.

First, FIG. 9 shows that the bracket 200 of the measurement device 70 is attached to the hanging frame 100. That is, the handle 221 is at the position of 0°.

The tip 222A of the clamp shaft 222 projects from the clamp hole 120 to be positioned between the photointerrupter 150, and blocks the light from the light emitting portion 151. Accordingly, the photointerrupter 150 can detect that the measurement device 70 is attached to the hanging frame 100.

In addition, the pin connector 210 of the measurement device 70 is inserted into the socket 110 of the hanging frame 100, and power is thereby supplied from the measurement machine main part 20 to the measurement device 70, and the signal from the measurement device 70 is output to the external control unit through the measurement machine main part 20.

Figure 10:
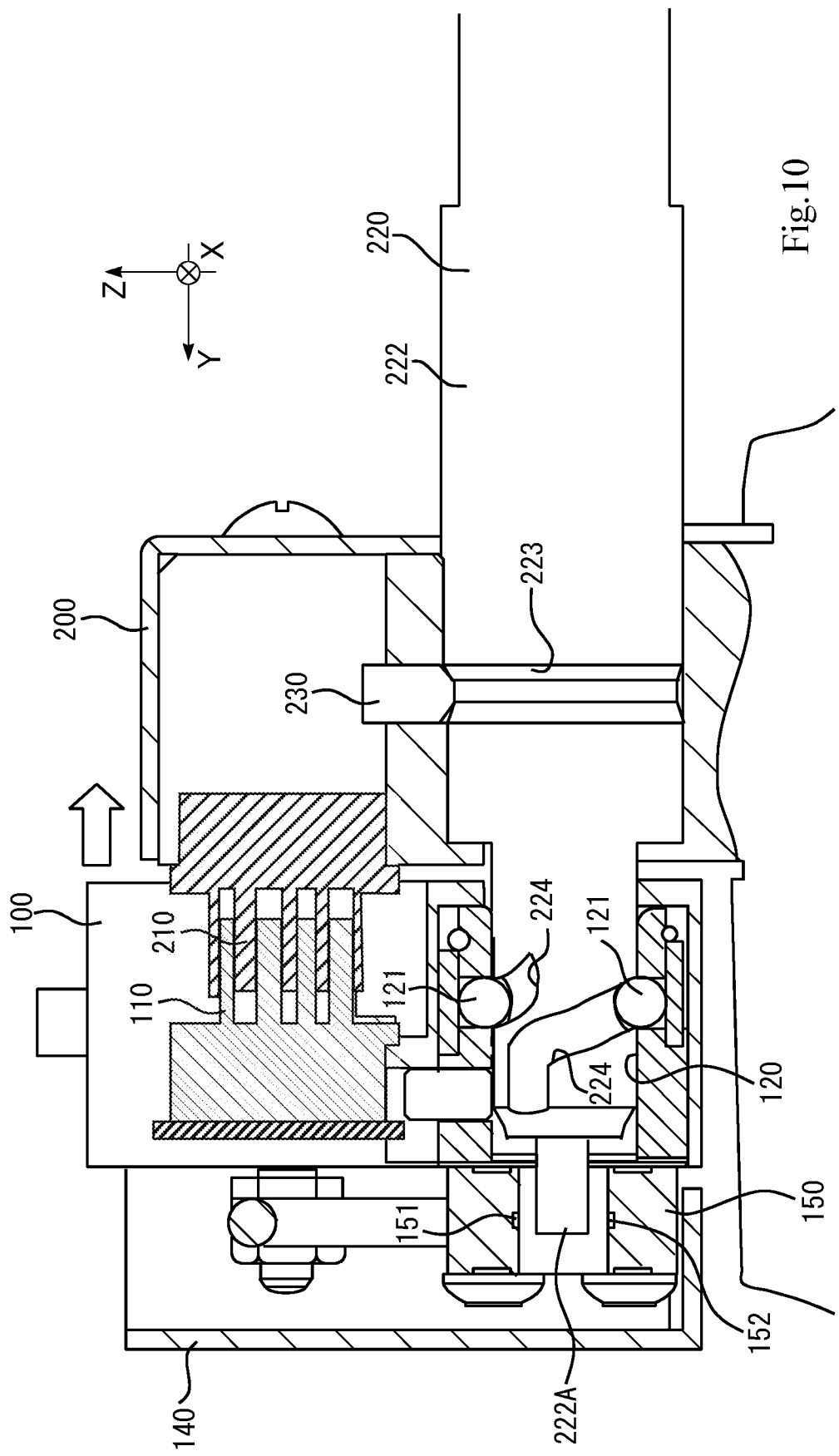
FIG. 10 is a diagram explaining the procedure for detaching the measurement device from the hanging frame by operating the handle of the clamper.

Here, it is assumed that the user holds and turns the handle 221 in the counterclockwise direction to replace the measurement device 70 (FIG. 10). (At this time, the user does not need to prepare anything for the replacement, such as turning off the power, as described above.) When the user holds the handle 221 and turns the clamper 220, the clamp shaft 222 is pushed out according to the relationship between the spline groove 224 and the lock key 121(the ball 121).

With reference to FIG. 10, the bracket 200 is slightly moved in the right direction (–Y direction) together with the clamper 220.

In the state of FIG. 10, since the handle 221 is not sufficiently turned, the tip 222A of the clamp shaft 222 is still between the photointerrupter 150, and the pin connector 210 and the socket 110 are electrically connected.

Figure 11:
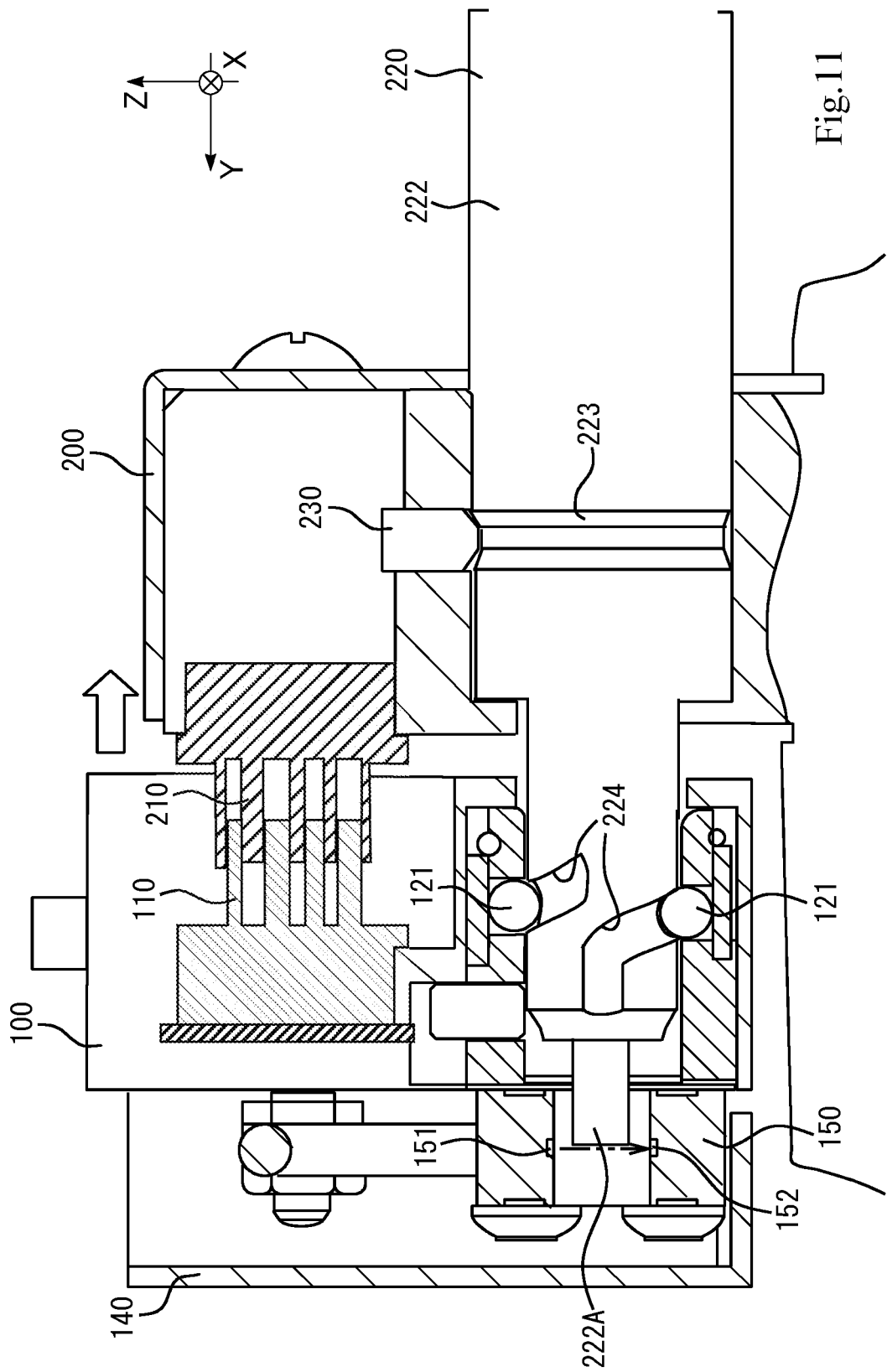
FIG. 11 is a diagram explaining the procedure for detaching the measurement device from the hanging frame by operating the handle of the clamper.
Figure 12:
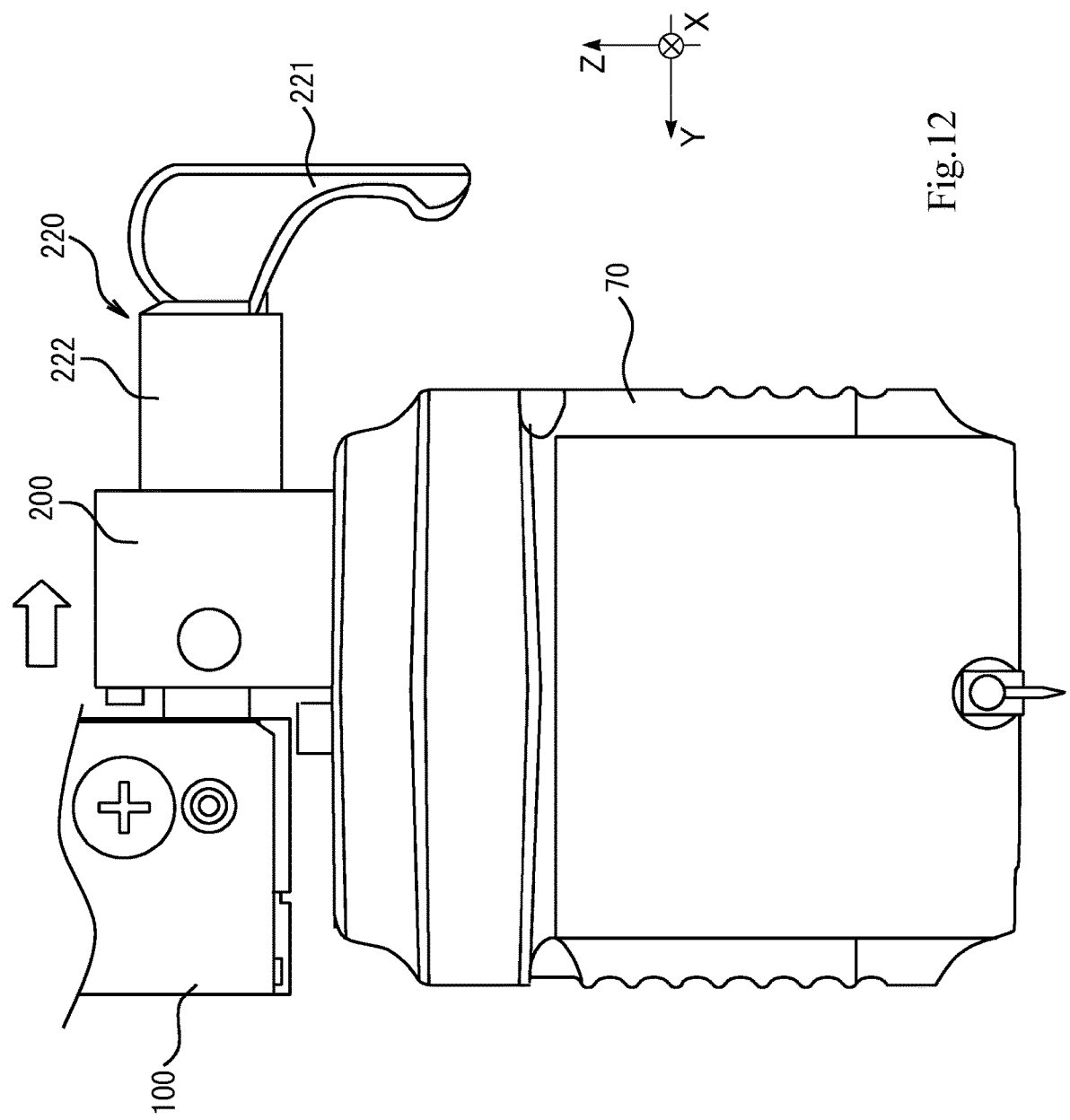
FIG. 12 is a diagram explaining the procedure for detaching the measurement device from the hanging frame by operating the handle of the clamper.

Now, it is assumed that the user further turns the handle 221 and that the handle 221 is turned by 90° (from 0° to 90°) (FIGS. 11 and 12).

Then, the bracket 200 is further pushed out together with the clamp shaft 222 according to the relationship between the spline groove 224 and the lock key 121 (the ball 121). At this time, the tip 222A of the clamp shaft 222 is moved away from between the photointerrupter 150, and the light from the light emitting portion 151 enters the light receiving portion 152. Then, the photointerrupter 150 detects that the measurement device 70 is being detached from the hanging frame 100. A signal from the light receiving portion 152 at this time is referred to as a "removal detection signal".

The removal detection signal is transmitted to the control unit through the cable 153, and the control unit instructs, when receiving the removal detection signal, the measurement machine main part 20 and the measurement device 70 to turn off themselves. Accordingly, the measurement machine main part 20 and the measurement device 70 perform turn-off processing. The measurement machine main part 20 stops power supply to the measurement device 70 first, and then stops its operation.

On the other hand, when the handle 221 is turned by 90° (when the tip of the clamp shaft 222 is removed from between the photointerrupter 150) as shown in FIG. 11, the pin connector 210 and the socket 110 are still electrically connected.

In other words, the engagement depth of the pin connector 210 and the socket 110 is longer than the insertion depth of the tip 222A of the clamp shaft 222 into the photointerrupter 150.

Figure 13:
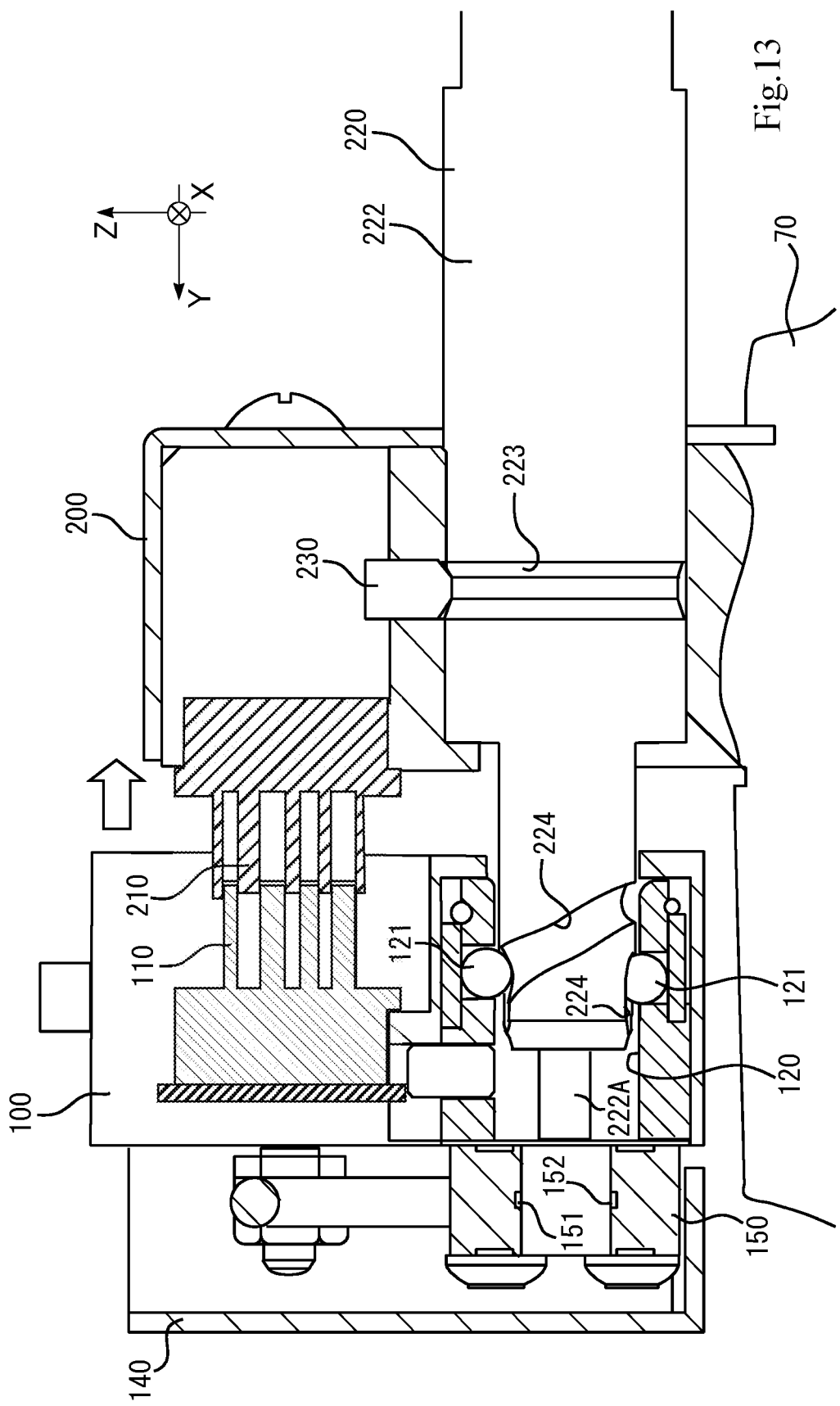
FIG. 13 is a diagram explaining the procedure for detaching the measurement device from the hanging frame by operating the handle of the clamper.

By this time, the power of the measurement machine main part 20 and the measurement device 70 has been turned off, and the user is only required to pull the measurement device 70 out of the hanging frame 100. At this time, the user does not intentionally pull out the measurement device 70, but further turns the handle 221 by 90° (from 90° to 180°) in the counterclockwise direction (in the direction of the arrow A in FIG. 6) so as to lift the handle 221. Then, the clamp shaft 222 is pushed out according to the relationship between the spline groove 224 and the lock key 121 (the ball 121), and the measurement device 70 automatically comes off from the hanging frame 100 (FIG. 13).

Since the user holds and turns the handle 221 in the counterclockwise direction so as to lift the handle 221 at this time, the user does not need to worry that the measurement device 70 falls off when the measurement device 70 is removed from the hanging frame 100.

A procedure for attaching the measurement device 70 to the hanging frame 100 is the opposite of the above description, and the redundant description is omitted.

In order to attach the measurement device 70 to the hanging frame 100, as the clamper 220 is turned in the clockwise direction (the direction of the arrow B in FIG. 6), that is, from 180° to 90°, and then, from 90° to 0°, the tip 222A of the clamp shaft 222 is inserted between the photointerrupter 150, and a connection detection signal is transmitted from the photointerrupter 150 to the control unit. The control unit turns on, when receiving the connection detection signal, the power of the measurement machine main part 20 and the measurement device 70. Since the control unit is electrically connected to the measurement device 70 through the measurement machine main part 20, the control unit acquires an identification signal of the connected measurement device 70 to automatically start the corresponding software.

As described above, according to the present exemplary embodiment, the photointerrupter 150 detects the position of the tip 222A of the clamp shaft 222, and which enables hot swapping. Thus, it is not necessary for the user to turn off the power, and to terminate and start the software when replacing the measurement device 70. It is possible for the user to easily attach and detach the measurement device 70 by operating the handle of the clamper 220, and to simply replace the measurement device 70 without tools (a special wrench and spanner).

Since the user attaches and detaches the measurement device 70 while stably holding the lever which is the handle 221, that is, the user replaces the measurement device 70 while supporting the measurement device 70 with both hands, the user barely need to worry about an accident that the measurement device 70 falls off at the replacement or the like.

Modification 1

In the above exemplary embodiment, the one-action attachment/detachment mechanism is provided to the hanging frame 100 and the bracket 200 that couple the measurement machine main part 20 to the measurement device 70. Furthermore, it is preferable that the one-action attachment/detachment mechanism is also provided to a stand 90. It has taken a lot of steps to attach and detach the standby measurement device 70 to and from the stand 90 in the conventional technique, although there is no need to turn off the power.

In this point, if the one-action attachment/detachment mechanism described in the above exemplary embodiment is also provided to the stand 90 (that is, the above hanging frame 100 is arranged on the stand 90), it is possible to easily attach and detach the measurement device 70 to and from the stand 90 only by operating the handle of the clamper 220.

Furthermore, it is possible to energize the measurement device 70 which is standing by on the stand 90.

Figure 14:
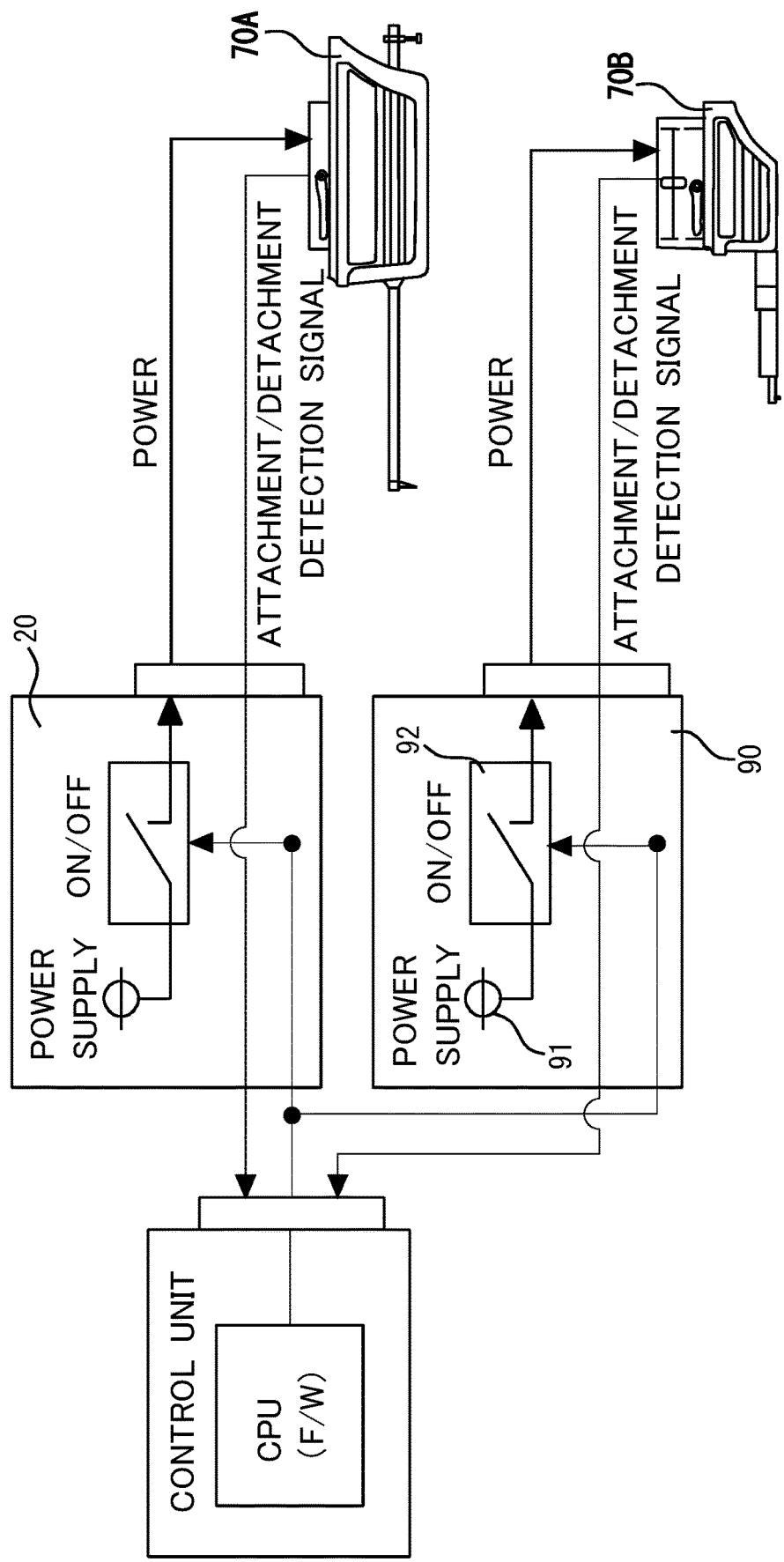
FIG. 14 is a functional block diagram.

As shown in the functional block diagram of FIG. 14, not only the measurement machine main part 20 but also the stand 90 is provided with a feeding power supply 91 and a feeding switch 92 for the measurement device 70B. Then, by turning on or off the feeding switch 92 according to an attachment/detachment detection signal from the photointerrupter 150, it is possible to energize the standby measurement device 70B. This produces an effect that there is no need to wait for a warm-up time of a measurement device after replacement. Thus, it is possible to easily replace a measurement device in a shorter time, and to significantly improve the measurement efficiency.

Note that, the present invention is not limited to the above exemplary embodiment and can be appropriately modified without departing from the scope of the invention.

The invention claimed is:

1. A surface texture measuring apparatus comprising:
   a measurement device configured to perform scanning measurement by contacting or without contacting a surface of an object to be measured; and
   a measurement machine main part including a drive mechanism part that moves the measurement device relatively to the object to be measured, the measurement device being provided so as to be replacable by attaching and detaching the measurement device to and from the drive mechanism part, wherein
   the measurement device comprises a bracket for attaching the measurement device to the drive mechanism part, the bracket including a first connector for transmitting and receiving a signal to and from the measurement device and feeding to the measurement device,
   the drive mechanism part comprises a support frame to which the bracket is detachably attached, the support frame including a second connector electrically connected to the first connector,
   the signal is transmitted and received between the first connector and the second connector, and the first connector is fed from the second connector while the first connector and the second connector are connected, and
   the first connector and the second connector are hot swappable when the measurement device is attached and detached to and from the drive mechanism part.

2. The surface texture measuring apparatus according to claim 1, wherein
   the bracket includes a shaft provided so as to project from an end face,
   the support frame includes an attachment/detachment detecting sensor that receives the shaft and detects whether the shaft exists,
   the second connector and the first connector are electrically connected when the attachment/detachment detecting sensor detects that the shaft exists, and
   the second connector and the first connector are electrically disconnected when the attachment/detachment detecting sensor detects that the shaft does not exit.

3. The surface texture measuring apparatus according to claim 1, wherein
   the bracket includes a shaft-shaped clamper provided so as to pierce the bracket,
   the clamper is provided so as to be rotatable about an axis and so as not to move forward and backward with respect to the bracket in an axial direction,
   the support frame includes a clamp hole for receiving the clamper, and
   the clamper and the clamp hole are engaged and disengaged by rotation operation of the clamper.

4. The surface texture measuring apparatus according to claim 3, wherein
   either one of the clamper and the clamp hole includes a spiral groove, and
   the other one of the clamper and the clamp hole includes a lock key to be received by the spiral groove.

5. The surface texture measuring apparatus according to claim 3, wherein
   the clamper has a tip having a handle as a manual operation means, and
   the handle is a lever type so as to be held.

6. The surface texture measuring apparatus according to claim 1, further comprising:
   a stand at which the measurement device for replacement stands by, wherein
   the stand includes the support frame.

* * * * *